Jan. 2, 1968 N. N. STEPHANOFF 3,360,870
APPARATUS FOR PULVERIZING AND DRYING SOLIDS
Original Filed Jan. 2, 1964 2 Sheets-Sheet 1
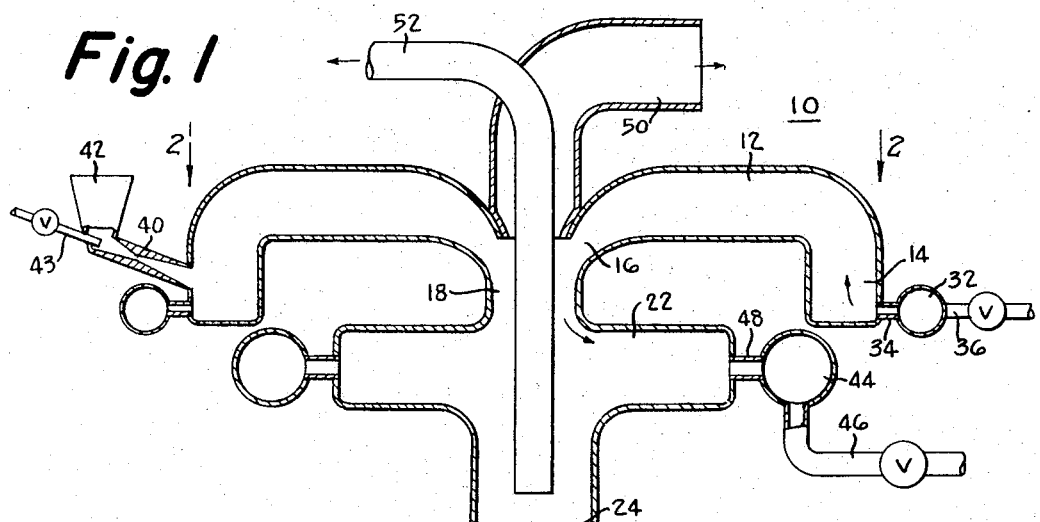
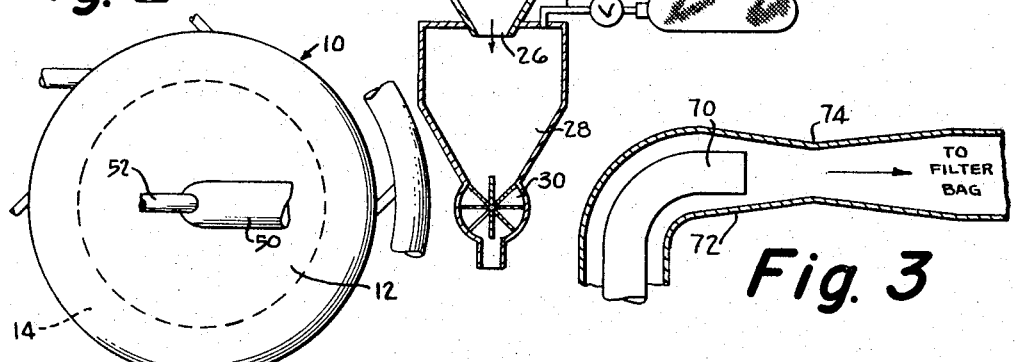
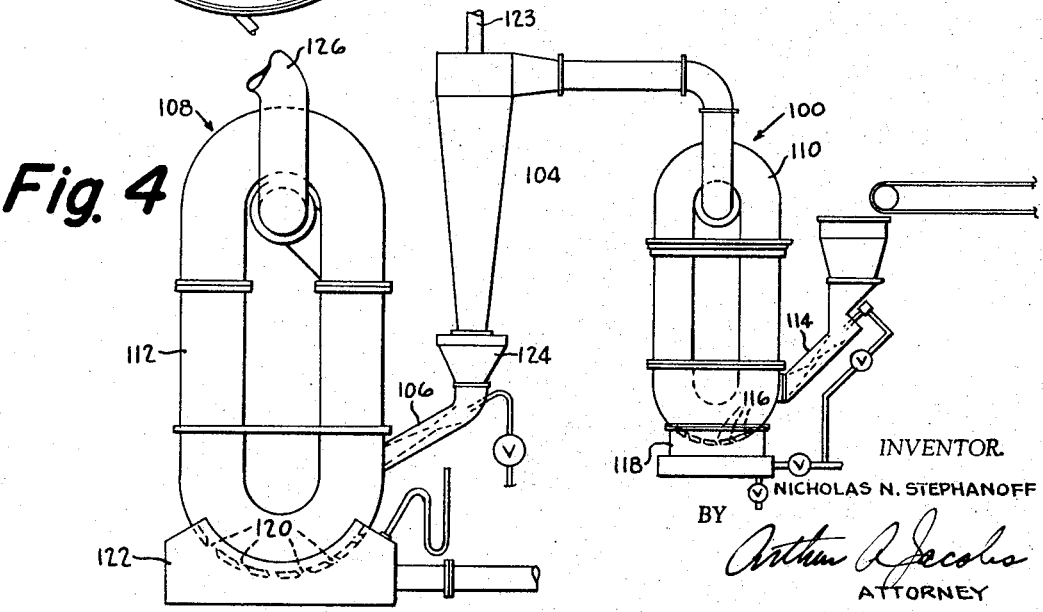
INVENTOR.
NICHOLAS N. STEPHANOFF
BY Arthur A. Jacobs
ATTORNEY Jan. 2, 1968   N. N. STEPHANOFF   3,360,870
APPARATUS FOR PULVERIZING AND DRYING SOLIDS
Original Filed Jan. 2, 1964   2 Sheets-Sheet 2

INVENTOR.
NICHOLAS N. STEPHANOFF
BY
Arthur R Jacobs
ATTORNEY

United States Patent Office 3,360,870
Patented Jan. 2, 1968

3,360,870
APPARATUS FOR PULVERIZING AND DRYING SOLIDS
Nicholas N. Stephanoff, Haverford, Pa., assignor to Fluid Energy Processing & Equipment Company, Lansdale, Pa., a corporation of Pennsylvania
Original application Jan. 2, 1964, Ser. No. 335,043. Divided and this application Nov. 4, 1966, Ser. No. 592,026
9 Claims. (Cl. 34—57)

ABSTRACT OF THE DISCLOSURE

This invention pertains to apparatus for centrifugally grinding solid or semi-solid particles and centrifugally separating lighter from heavier ground particles. The apparatus comprises two separate arcuate chambers, each of which is provided with tangentially arranged nozzles connected to a source of fluid under pressure for causing centrifugal flow through the chambers. There is a one-way connection between the chambers whereby the lighter particles on the inner portion of the centrifugal vortex of the first chamber are passed into the second chamber for entrainment in the vortex in the second chamber. There is no flow passage back from the second to the first chamber so that the particles in the second chamber can only be exhausted to a collection station.

This is a division of co-pending application Ser. No. 335,043, filed on Jan. 2, 1964.

This invention relates to apparatus for drying solid particles, and it particularly relates to apparatus for obtaining almost complete dehydration of materials which are ordinarily extremely difficult to dry while simultaneously obtaining a very fine state of subdivision of the particles.

It is recognized that certain inorganic oxides, such as silicon dioxide (silica), aluminum oxide (alumina), titanium dioxide, magnesium oxide (magnesia), zinc oxide, ferric oxide, etc. are difficult to completely dehydrate, especially when in comminuted form because not only are such materials hygroscopic but they also tend to agglomerate while they are still moist. This agglomeration not only interferes with the process of pulverization since the particles cannot easily impinge against each other when they are adhered to each other, but also tends to clog the apparatus used in the process. This is especially true of such materials as silica gel and titanium dioxide.

Although the present invention is not limited thereto but is generally applicable to all substances which can withstand the high temperatures used and which are difficult to dehydrate, the inorganic oxides and, particularly, silica gel are used herein as excellent exemplifications of the invention.

The general method of preparing silica gel is by acidifying a solution of sodium silicate ($Na_2SiO_3$) to precipitate a gelatinous mass (hydrogel), some of the acidified silicate remaining in solution (hydrosol). The separated hydrosol is then allowed to set to a hydrogel. The collected hydrogel is crushed, washed and dried to produce a hard, stable, granular product called silica gel ($SiO_2nH_2O$). The dried material is then ground, as required.

Finely divided silica gel is useful as a filler and extender for paints, varnishes, plastics, etc. It is also extensively used, in a finely divided, low density state, as a flattening agent to reduce light reflections from otherwise glossy surfaces. It is, therefore, often highly desirable that the silica gel be of very low bulk density in addition to being finely divided and dry.

It has, heretofore, been the practice to grind and dehydrate oxides such as silica gel in fluid energy mills wherein the particles are whirled around in an atmosphere of a hot gaseous fluid such as superheated steam which imparts sufficient kinetic energy to cause the particles to impact each other and pulverize each other. In such process, the silica gel was not only ground but substantially dried because of the high temperature of the incoming steam. However, it was not possible, in this way, to dehydrate the material below a moisture content of about 7–10% by weight because silica gel adsorbs water vapor from a gas-vapor mixture until the vapor pressure of the adsorbed moisture approaches the vapor pressure of the gas carrying the vapor and, in the case of superheated steam, the adsorbed moisture is about 7–10%. On the other hand, no other available heated fluid, such as compressed air, could supply sufficient kinetic energy to accomplish fine enough grinding.

It was, heretofore, proposed to pre-dry silica gel and the like before the steam grinding in order to remove a greater amount of the water. However, such prior pre-drying processes generally consisted of batch-drying the mass in a static state. This caused an agglomeration of the particles into clusters which not only greatly increased the bulk density of the product but also made it very much more difficult to grind into the desirable finely-divided state during the steam grinding phase.

The agglomeration of the particles into clusters is believed due to the fact that the silica gel consists of minute particles, in Angstrom unit sizes, which are held together by an interface of the carrier vehicle, such as water. It is further believed that these small particles carry on their surfaces relatively thick adsorbed and, perhaps, chemically bonded layers of the vehicle. When the vehicle is water, it may possibly form a semi-solid coating consisting of metasilicic and/or orthosilic acids. It is also believed that the particles are closely packed in a generally cubic arrangement with the interstitial vehicle forming both a bond and a separation between the particles. When the silica gel is pre-dried in a batch, in the conventional manner, the interstitial vehicle is removed and the particles collapse toward each other. This results in the formation of the large agglomerated clusters and the high bulk density.

As noted above, silica gel is produced from hydrogel which is a precipitate from an acidified solution of sodium silicate. It is now known that the greater the amount of water remaining in the hydrogel the finer will be the size of the particles after completion of the drying-grinding process. However, it was not feasible, heretofore, to use wet silica gel containing more than about 70% by weight water because with the prior type one-stage steam grinding process, even with a 100% heat utilization, it would still have been necessary to use at least 13.9 lbs. of steam per lb. of dry product. Even then, the product would still have contained about 7–10% by weight moisture. Furthermore, not only would it have been expensive but it would have been very inefficient from a grinding standpoint since the large proportion of steam to solid particles would have made for relatively few impactions between the particles because of the relatively small number of particles in the chamber.

On the other hand, in accordance with the present invention, only about 2–3 lbs. of superheated steam per lb. of solids are used, and then, only for grinding, while hot, low pressure air or a similar water free gas is used for the drying, so that the total cost is considerably reduced. Furthermore, because of the substantially lower proportion of steam relative to solid particles, there is a much greater degree of pulverization. In addition, as much as 99.99% dehydration may be obtained while, at the same time, agglomeration is prevented and the bulk density is greatly reduced.

The fineness of particle size produced by the aforementioned greater grinding effect may also be enhanced, in accordance with the present invention, because it is possible to use raw feed containing a much higher proportion of water than was heretofore possible. As was mentioned above, prior one-stage steam grinding could not be feasibly used with raw feed containing more than 70% weight water. In accordance with the present invention, however, raw feed containing at least 82% by weight water has been used and it is still possible to obtain a dehydration down to the aforementioned 99.99%, with the use of no more than the aforementioned 2–3 lbs. steam per lb. of dry product.

It is, therefore, one object of the present invention to provide apparatus for grinding and drying solids in a liquid carrier vehicle in a manner to obtain both an enhanced grinding and an enhanced drying effect.

Another object of the present invention is to provide apparatus of the aforesaid type which is relatively inexpensive as compared to prior apparatus utilized for this purpose.

Another object of the present invention is to provide apparatus of the aforesaid type wherein a greater grinding and dehydration effect is obtained for hygroscopic materials, such as silica gel and other similar inorganic oxides, than was heretofore possible.

Another object of the present invention is to provide apparatus of the aforesaid type wherein it is possible to utilize a raw feed containing a higher proportion of liquid vehicle than was heretofore possible.

Other objects and many of the attendant advantages of this invention will be readily appreciated as the same becomes better understood by reference to the following description when read in conjunction with the accompanying drawings wherein:

FIG. 1 is a somewhat diagrammatic, sectional view of an apparatus embodying the present invention.

FIG. 2 is a top plan view of the apparatus of FIG. 1.

FIG. 3 is a fragmentary sectional view of a modified form of the apparatus of FIG. 1.

FIG. 4 is a somewhat diagrammatic, fragmentary side elevational view of an alternative form of apparatus embodying the present invention.

Figure 5:
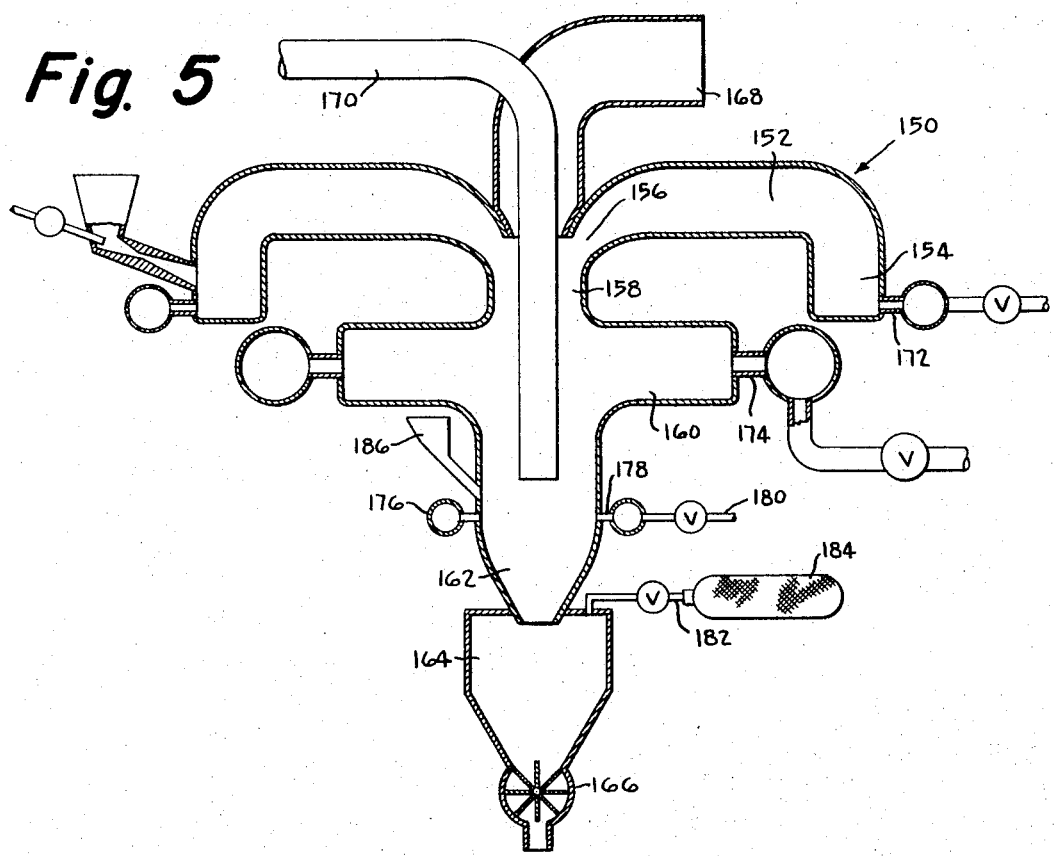
FIG. 5 is a somewhat diagrammatic sectional view of another modification of the apparatus of FIG. 1.

Referring now in greater detail to the various figures of the drawings wherein similar reference characters refer to similar parts, there is shown in FIG. 1 an apparatus, generally designated 10, comprising an annular chamber 12 integral with a peripherally dependent, narrower annular chamber 14. The inner portion of the chamber 12 is connected through a downwardly and inwardly inclined annular passage 16 to a relatively narrow vertical chamber 18. The open lower end of the chamber 18 is in fluid communication with the center of a circular chamber 22. The bottom of chamber 22 is provided with a central opening in fluid communication with a separating chamber 24 having a reduced bottom opening 26 leading into the top of a quiescent chamber 28, the bottom portion of which is also of reduced dimensions. At the open bottom of chamber 28 is a star valve 30.

An annular manifold 32 surrounds the chamber 14 and is in fluid communication with this chamber through a plurality of tangential nozzles 34. These nozzles 34 are arranged tangentially to the periphery of the chamber 14 and at such angles relative to each other that the fluid streams issuing therefrom impact each other. These nozzles may be either the abrupt type or the so-called convergent-divergent type described in applicant's prior Patent No. 2,297,726. The abrupt type provide less velocity but less temperature drop, while the convergent divergent type provide greater velocity and, therefore, greater kinetic energy for grinding purposes, but greater temperature drop. The manifold 32 is fed with the appropriate fluid (depending on the particular process then being used) from a source of fluid (not shown) through a valved conduit 36.

One or more particle feed inlets 40 are provided to lead from a hopper 42 into the chamber 14. These inlets 40 are downwardly inclined as well as tangentially arranged relative to the periphery of the chamber 14. These inlets are illustrated as being of the injection feed type with a venturi passage therein and actuated by fluid pressure injected through a duct 43 connected to a source of fluid (not shown). However, other types of feed means, such as mechanical screw feeders and the like, may be substituted.

The chamber 22 is also surrounded by an annular manifold 44 connected to a source of fluid (not shown) through a valved conduit 46. The manifold 44 is in fluid connection with the chamber 22 by means of a plurality of tangentially directed nozzles 48.

An exhaust duct 50 extends from a central opening in the chamber 12 just above and in communication with the top of chamber 18. Coaxial with the duct 50 is an exhaust duct 52. The duct 52 extends down through the chamber 18 into the upper portion of chamber 24. A conduit 54 leads from an opening in the top of quiescent chamber 28 through a bleeder valve 56 to a filter bag 58. The importance of this bleeder valve in increasing the yield of the final product will be fully described hereinafter.

In one method of operation, the silica gel or other material to be ground and dehydrated is fed into the chamber 14 through inlet 40. In the chamber 14, the particles are whirled around and impacted against each other in the vortex created by the streams of superheated steam so that they pulverize each other. At an inlet steam temperature of about 900°–1000° F. or higher and at a pressure of about 140 p.s.i.g., it is estimated that in a chamber 14 which is about 6 inches wide and has a diameter of about 3 feet, the velocity of the fluid at any one point in the horizontal vortex would be about 900–1,500 ft./sec., thereby causing each particle to rotate between 100 and 200 times by the time it reaches the top of the chamber. Separate, discrete particles rise to the top of the chamber because as the feed of steam and raw material continues, the vortex itself slowly rises through the chamber 14. This rising motion is relatively gentle and may be as low as 3–5 ft./sec., although it is generally about 5–15 ft./sec. The many rotations of the particles statistically allows a large number of impactions between them resulting in very fine grinding because the proportion of solids to fluid is very high. At the same time, the slow upward rise of the vortex allows ample time to dry the dispersed particles and cool the hot fluid.

As the vortex gas rises through the chamber 14, the most finely ground particles move up therewith, as through a stack. These fine particles have, meanwhile, not only been finely ground but also partially dried during the grinding stage to an extent sufficient to prevent reagglomeration upon contact with each other or with the walls of the apparatus. There is, furthermore, no possibility of contamination of the fine particles with coarse particles due to the so-called "kick-over" effect so often encountered in standard fluid energy mills, because the separation of large pieces is not affected by variations in centrifugal force at this area but only by variations in weight and bulk.

Further separation between the very fine and the less fine particles takes place as the whirling horizontal vortex rises into the relatively flat, wide chamber 12. In this chamber 12, the vortex, now unrestrained by the relatively close walls of the chamber 14, assumes its normal inwardly directed accelerative spiral form. In this spiral motion, as each portion of the vortex spirals inwardly and its radius decreases, its rotational velocity increases. However, the less fine particles, or those which are still relatively wet and, therefore, heavier and with a tendency to form clusters, remain on the fringe of the vortex in chamber 12, whirling around until they are dry and free from clustering tendencies, at which time they are, in turn, carried toward the center of the vortex by viscous drag of the fluid.

During its travel through the chamber 12, the steam in the vortex drops to about 250° F. due to evaporation of the adsorbed water on the silica gel particles.

As the particles are carried into the annular passage 16, they are rotating at very great velocities (creating centrifugal forces of about 100,000–150,000 g). As the vortex moves down through the chamber 18, the particles tend to hug the wall of this chamber because, although very fine and light, they are still heavier than the steam and, therefore, have a greater centrifugal and separational force. The lighter steam moves toward the center and is thereby separated. It then moves upward through the duct 50 to exhaust. Meanwhile, as described more fully below, air, a denser gas than the steam, descends from chamber 22 into the chamber 24 and, because of the presence of the steam in chamber 18, creates a dynamic barrier in that chamber, similar to a weather cold front in the earth's atmosphere. However, a small quantity of steam may descend into chamber 22 and then, together with air, into chamber 24 from whence it exhausts through duct 52 together with the air. This is, in fact, often desirable because it acts to drag more of the solids into chamber 22.

The particles in chamber 18, because of their high centrifugal force, are thrown into the chamber 22. In this chamber, very hot air (between about 1,000°–1,700° F.) at low pressure (about 2–4 p.s.i.g. differential over the normal pressure in the chamber) is injected through the inlets 48. These inlets 48, being utilized for low pressure, hot air, are much larger than the steam inlets 34 into chamber 14 and are of the abrupt type, whereas the inlets 34 are preferably of the convergent-divergent type when using the apparatus for this particular process. However, since the inlets 48 are tangentially arranged, they also create a turbulent vortex wherein the particles are whirled around and dispersed so that any tendency to cling together in clusters in overcome and the hot air now reaches the surface of every particle to dry it completely. Here again, the wetter, heavier particles are kept whirling on the outer fringe of the high intensity vortex until completely dry and light enough to be carried inwardly by the viscous drag of the exhausting gases.

The hot air here completely replaces the steam atmosphere around each particle with the air atmosphere. Consequently, upon cooling, each particle is cushioned against the others with an air atmosphere and will not reagglomerate. On the other hand, when steam alone is used, as in prior processes, the residual steam tends to condense and cement some of the impacted particles together.

The centrifugal force induced in the particles in chamber 22 is overcome by the frictional drag of the viscous fluid, and the lighter, drier particles are pulled out and down by the escaping fluid into the separating chamber 24. Here, substantially all the air and any residual steam that may be present separates from the dry particles and flows up through the duct 52 to exhaust, while the dry particles, still whirling, are carried into the quiescent chamber 28 and are removed through the valve 30.

It is sometimes desirable that a small amount of air be sucked down with the whirling particles into the chamber 28 because this aids in greatly increasing the collection of the particles. This is due to the fact that when the fluid vortex enters the chamber 28, the solid particles shower radially outwardly and settle. However, at the center of the collapsing vortex a secondary vortex is established and this secondary vortex is pulled back up into chamber 24. Some of the solid particles are entrapped in this secondary returning vortex and would ordinarily be sucked back therewith into the chamber 24. However, this is prevented by the bleeder valve 56 because it causes the vortex entering through opening 26 to be destroyed, thereby freeing the air to carry these particles through conduit 54 to the dust collector bag 58.

Since the temperature of the air is relatively low at this point (about 175°–250° F.) because of the evaporation of all the moisture from the particles, ordinary filter bags can be used. In this manner, for instance, the collection of the silica gel particles, which are notoriously very difficult to collect in centrifugal collectors, is enhanced from about 65–75% to about 90–95%.

In some instances, the pressure in the steam duct 50 may be higher than the pressure in the air duct 52. In such event, in order to prevent too much steam from flowing back into the chamber 22, an exhaust fan may be installed in the duct 50 to overcome this back pressure, thereby balancing the dynamic barrier at 18.

The exhaust ducts 50 and 52 are illustrated as leading to separate exhaust stations (not shown) which, in the present instance, may consist of ordinary filter bags because the temperatures of the exhaust gases are relatively low (between about 170°–250° F.). As was stated above, an exhaust fan may be used to prevent any backwash and to balance the dynamic barrier.

The apparatus may also be designed to permit both exhaust ducts to lead to a single filter bag. This is illustrated in FIG. 3 where the duct 70, corresponding to duct 52, is coaxially arranged within the duct 72, corresponding to duct 50, so that both may lead to a single filter bag. As illustrated, the duct 72 is preferably provided with a venturi section 74 to increase the velocity and lower the pressure, thereby inducing a flow in the duct 72 toward the filter bag (not shown). An exhaust fan may also be placed in the duct 72 upstream of the filter bag.

The above process can also be carried out with an assembly of standard type fluid energy mills as is illustrated in FIG. 4. Here, there is shown a first mill 100 connected from its outlet through a duct 102 to a separator of the centrifugal type, designated 104, which is connected to the raw feed inlet 106 of a second, much larger, fluid energy mill, generally designated 108. Both the mills 100 and 108 are of the type described in applicant's prior Patent No. 2,590,220, whereby they each comprise an oval shaped, vertically positioned chamber, as at 110 and 112 respectively, each having a raw feed inlet, as at 114 for mill 100 and at the previously designated 106 for mill 108. At the bottom of mill 100 are tangential gas nozzles 116 leading from a manifold 118. Similar tangential nozzles 120 leading from a manifold 122 are provided at the bottom of mill 108, these nozzles being larger than those shown at 116 in mill 100. Furthermore, the nozzles 116 are preferably of the convergent-divergent type for greater turbulence. The feed inlets 106 and 114 are illustrated as being of the fluid-pressure feed type, but this is for illustrative purposes only since other types of feed means may be used, especially insofar as regards inlet 114.

In operation, the raw feed is introduced into the bottom of chamber 110 through inlet 114 and is picked up by tangential jets of superheated, high pressure steam from the nozzles 116. These jets of steam impact one another and form a turbulent mixture wherein the particles impact against and grind each other. The particles and steam, in a vortex, move upwardly through the left hand portion of the chamber 110 and as they pass around the upper bend, which constitutes a classifier section, the centrifugal force on the larger, wetter particles keeps them on the outside of the vortex where they make additional passes through the mill until ground fine and relatively dry. Meanwhile, the finer, drier particles are swept through the outlet at the radially inner portion by the steam and pass through the duct 102 to the separator 104 where most of the steam flows upwardly through the exhaust duct 123 while the solid, semi-dry particles fall, together with some steam, into the hopper 124 from where they are injected into the bottom of the chamber 112 of mill 108 through inlet 106. Here, the particles are picked up by very hot, low pressure air directed through the tangential nozzles 120 from manifold 122. The particles are then whirled through the chamber 112 by the hot air in similar fashion to their travel through the chamber 110 except that, in this case, little grinding takes place because the low pressure air does not have the high kinetic energy of the high pressure steam. However, the hot air effects a very thorough drying of the particles, the heavier, wetter particles, again, staying on the outer fringe of the whirling stream, because of their greater centrifugal force, until they are dry and light, while the lighter, dry particles are swept up by the air stream through the exhaust duct 126 to a filter bag or the like. The small amount of moisture left in the air is greatly diluted by the air and, being still in a superheaetd condition, is not adsorbed by the solid particles, whereby the particles are delivered in a 99.9% dry state.

In some cases, where the initial moisture in the raw material is very high, i.e. over about 70% by weight, and it is not necessary that the finished product be either absolutely bone dry or extremely fine, it has been found more economical to first partially dry the material, while in a turbulent state, with cheap, low pressure, hot air, then grind with superheated steam. If it is desired to increase the dehydration, a further low pressure, hot air pick-up is provided after the steam grinding stage so that the steam atmosphere around the particles is replaced with air. The material is only partially dried in the first stage because if complete drying were effected, the still large, wet particles would lose substantially all their interstitial and adsorbed moisture and would become cemented into clusters. Such clusters would be more difficult to separate, requiring much more steam, even when using high pressure, superheated steam.

This process may be carried out in substantially the same apparatus as in FIGS. 1 and 4 with a reversal of steps, whereby the low pressure hot air is used first, followed by grinding with high pressure, superheated steam. The only substantial changes required in the apparatus are to reverse the size and type of nozzles used and to provide for additional hot air pick-up where required.

FIG. 5 shows one other form of the apparatus of FIG. 1 wherein the apparatus, generally designated 150, comprises an annular chamber 152 integral with a dependent annular chamber 154. The chamber 152 communicates through the central annular passage 156 with a narrow chamber 158 leading into an annular chamber 160 from which depends a centrifugal separator chamber 162 with an open lower end leading into a quiescent chamber 164 having a star valve 166 at its bottom, while ducts 168 and 170 lead to exhaust, all as in FIG. 1. However, here, the tangential inlets 172 into chamber 154 are of the abrupt type and lead from a source of low pressure, hot air while the tangential inlets 174 into the chamber 160 are preferably of the convergent-divergent type and lead from a source of high pressure, superheated steam. In addition, a manifold 176 surrounds the lower portion of separator chamber 162 and is provided with tangential inlets 178 of the abrupt type. The manifold 176 is supplied with low pressure, hot air from a source thereof (not shown) through a valved conduit 180.

In this reverse operation, the low pressure hot air in chamber 154 disperses and partially dries the particles in a vortex which moves up into the chamber 152 from where the lighter, drier particles are carried through annular passage 156 to chamber 158 where centrifugal force carries them into the chamber 160 while the air is exhausted through duct 168. In chamber 160 the high pressure, superheated steam from inlets 174 create a high intensity vortex wherein the particles are ground and then carried down by centrifugal force into separator chamber 162 where the steam escapes into the duct 170. Here, the particles are picked up by additional hot air injected through inlets 178 and are carried thereby into quiescent chamber 164. The remaining action is the same as in FIG. 1 wherein the major portion of the particles fall to the bottom of the chamber 164 while a small amount of air and some entrained fine particles flow out through a conduit 182 to a filter bag 184. An auxiliary inlet means is provided at 186 (see FIG. 5) for a purpose to be hereinafter described.

The same reverse process may be carried out with the apparatus of FIG. 4 except for that mill 110 would be larger than mill 108 and would have larger, abrupt nozzles 116 while the smaller mill 108 would have smaller convergent-divergent nozzles 120. The additional hot air pick-up may be provided in the duct 126. It is, however, also possible to utilize a single mill for both air pre-drying and steam grinding. This is illustrated in FIG. 6.

Figure 6:
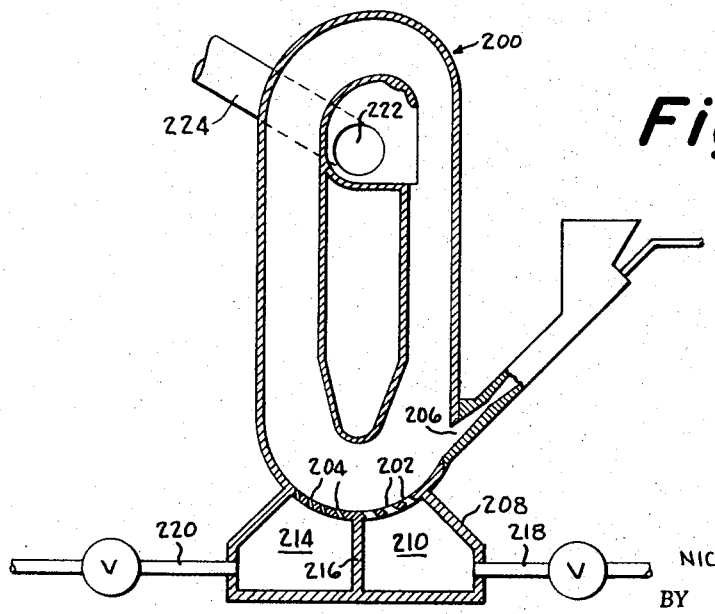
FIG. 6 is a somewhat diagrammatic view of an alternative form of the embodiment of FIG. 4.

FIG. 6 shows a fluid energy mill, generally designated 200, that is practically identical to the mills 100 and 108 except that at its bottom there are two sets of inlet nozzles, designated respectively 202 and 204. The nozzles 202 are tangentially directed and are relatively large and abrupt while the nozzles 204 are tangentially directed but are relatively small and preferably of the convergent-divergent type. Each set of nozzles occupies one-half of the bottom of the mill, the nozzles 202 being adjacent the feed inlet 206. Under the chamber of the mill is a manifold 208 divided into two manifold chambers 210 and 214 by a vertical partition 216. The manifold chamber 210 supplies the nozzles 202 with low pressure hot air which it receives from a source (not shown) through valved conduit 218. The manifold chamber 214 supplies the nozzles 204 with high pressure, superheated steam which it receives from a source (not shown) through valved conduit 220.

In the operation of the apparatus of FIG. 6, the raw feed passes through inlet 206 into the bottom of the chamber of the mill 200 where it is picked up by low pressure hot air from nozzles 202. This low pressure hot air disperses the particles in a hot turbulent environment wherein they are partially dried. At the same time the tangency of the nozzles 202 is such that the incoming hot air carries the particles over the nozzles 204. As the stream of particles and hot air pass over the nozzles 204, the high pressure, superheated steam from the nozzles 204 cause impactions of the particles at high velocities against each other, resulting in their mutual pulverization. The presence of the hot air does somewhat adversely influence the grinding effect of the high pressure steam. However, it not only acts as an additional drying medium (which may be generated by inexpensive direct combustion) but also sufficiently dilutes the steam to make it possible to considerably drop the mill exhaust temperatures, to as low as 175°–200° F. in some cases, while still being hot enough to prevent any undesirable condensation. This is because the relative humidity of the air is still below 100% at these temperatures and the steam is still in a superheated vapor stage. If steam only were used, the exhaust would have to be at least about 250°–300° F. at these prevailing pressures. This lower exhaust temperature, in turn, permits the extraction of more heat from the steam. For example, if the steam is initially at 975° F. and the exhaust temperature may be as low as 175° F., there is 800° F. of temperature differential available for evaporation. On the other hand, if the exhaust temperature must be 275° F., only 700° F. is available for evaporation. The additional hot, low pressure air also permits the use of greatly decreased amount of high pressure steam since only enough of such steam is required as is necessary for grinding, the bulk of the dehydration being taken care of by the hot air. Finally, the fact that the particles are commovingly transported directly from the hot air station over the nozzles 202 to the grinding station over the nozzles 204, whereby the particles are always in turbulent suspension, prevents any possibility of reagglomeration.

After the particles are ground in the area of nozzles 204, they pass around the mill chamber in the same manner as described above in regard to mills 100 and 108, the finer, drier particles being swept out through the outlet 222, together with the air and steam, into an exhaust duct 224. If desired, an additional hot air pick-up similar to that shown at 176–178 in FIG. 5, may be provided in the duct 224. It is also possible to provide an exhaust fan therein.

The above-described apparatus is also utilizable for simultaneous chemical reaction between the particles being ground and other materials, or the simultaneous coating of the particles with other materials such as wax, synthetic resins, etc.; or the simultaneous polymerization of a liquid, used as a diluent, such as styrene, butadiene, chloroprene, isobutylene and other synthetic resins useful in the formation of artificial rubber and the like; or the simultaneous addition of pigments, fillers, lubricants, plasticizers, stabilizers or the like.

The above materials for chemical reaction, coating, polymerization, etc., may be introduced directly into the first stage of grinding, the second stage of air dehydration, or the third stage (where used) of after-drying with air. As an example of this use, an auxiliary inlet means is shown in FIG. 5 at 186. This inlet, which may be of any desired type, is utilizable in the present instance for inserting melted, microcrystalline wax, at a controlled uniform rate, into the chamber 162. Here, as the particles are being entrained and whirled around in the low pressure air from inlets 178, the wax is also sucked up into the vortex and, as the particles move through the fluid air-wax mixture, the wax settles on and adheres to the particles as they cool, thereby homogeneously coating them. The inlet 186 may also be used for the insertion of resins, oils, pigments, fillers, etc. Furthermore, the inlets 178 may be used to insert fluids which form coatings on the particles, or which engage in chemical reaction with the particles, or which have other effects on the particles in addition to or in lieu of a dehydrating function. These solid or fluid materials may also be inserted into the mixture at any of the other stages, either into the grinding vortex or the dehydrating vortex.

Although, hot low pressure air has been described above as the dehydrating fluid medium, other elastic fluids may selectively be used in accordance with the substances being treated and the conditions desired. For example, these fluids may be selected from the group consisting of combustion gases such as CO and $CO_2$, lower aliphatic hydrocarbons such as methane, ethane and propane, and inert gases such as nitrogen. Also such gases as helium, hydrogen, hydrogen sulfide, chlorine, methyl chloride, ammonia, nitric acid, etc. It may also be possible to utilize simple, substituted and unsubstituted aromatic hydrocarbons such as benzene, monochlorobenzene, etc., if the temperature conditions are not such as would cause cracking of the hydrocarbon. In general, any gas which would not adversely affect the final product for the purposes desired may be used.

It should be noted that the pressure in the device may be either over, at or below atmospheric pressure in accordance with the materials and fluids used and the type of process being carried out.

It should also be noted that the ability to utilize very high temperatures, i.e. 1600°–1700° F., and higher, permits calcination of the particles when so desired.

Obviously, many modifications and variations of the present invention are possible in the light of the above teaching. It is, therefore, to be understood that within the scope of the appended claims, the invention may be practiced otherwise than as specifically described.

The invention claimed is:

1. Apparatus for treating solid particles comprising a first chamber, inlet means for solid particles leading into said first chamber, fluid inlet means leading into said first chamber, said fluid inlet means being tangentially arranged to direct streams of fluid against each other in said chamber to form a turbulent, whirling vortex, a second chamber in direct fluid connection with said first chamber, said first and second chambers being constructed and arranged to permit passage only from the first to the second chambers, second fluid inlet means leading into said second chamber, said second fluid inlet means also being tangentially arranged to direct streams of fluid against each other to form a turbulent whirling vortex, means to centrifugally separate treated solid particles from the fluid to the vortex in said second chamber, and means to collect said treated solid particles.

2. The apparatus of claim 1 wherein means to centrifugally separate solid particles from vortex fluid are also provided between the first and second chambers.

3. The apparatus of claim 1 wherein said first and second chambers comprise contiguous portions of a unitary annular chamber.

4. The apparatus of claim 1 wherein each of said chambers is an annular chamber, said chambers being connected through a centrifugal separator.

5. The apparatus of claim 1 wherein each chamber is a horizontal annulus, the first chamber being of greater area and being positioned above the second chamber, said chambers both being connected by a direct vertical annular passage.

6. The apparatus of claim 1 wherein additional inlet means are provided at selective positions relative to said chambers for the insertion of additive materials.

7. Apparatus for treating solid particles comprising a first horizontally annular chamber, a second horizontally annular chamber of substantially less width than said first chamber but being coaxial therewith, said second chamber being dependent from the peripheral portion of said first chamber and opening directly into said first chamber to provide a direct annular fluid flow path between said chambers, inlet means operatively connected to said second chamber for directing solid particles into said second chamber, fluid inlet means tangentially positioned relative to the outer periphery of said second chamber and arranged to direct fluid streams toward impingement against each other within said second chamber to form a turbulent, horizontal vortex in said second chamber, said flow path between said chambers permitting upward movement of the vortex from the second to the first chamber, the relatively larger width of the first chamber permitting the vortex to assume a normal radially inwardly directed spiral flow path toward the center of the first chamber, and means at the center of said first chamber to centrifugally separate treated solid particles carried thereto by the spiral motion of the vortex from the fluid of said vortex.

8. Apparatus for treating solid particles comprising a first horizontally annular chamber, a second horizontally annular chamber of substantially less width than said first chamber but being coaxial therewith, said second chamber being dependent from the outer peripheral portion of said first chamber and opening directly into said first chamber to provide a direct annular flow path between said chambers, inlet means operatively connected to said second chamber for directing solid particles into said second chamber, fluid inlet means tangentially positioned relative to the outer periphery of said second chamber and arranged to direct fluid streams toward impingement against each other within said second chamber to form a turbulent, horizontal vortex in said second chamber, said flow path between said chambers permitting upward movement of the vortex from the second to the first chamber, the relatively larger width of the first chamber permitting the vortex to assume a normal radially inwardly directed spiral flow path toward the center of the first chamber, a fluid exhaust duct leading upwardly from the center of said first chamber, a centrifugal separator chamber leading downwardly from said center and in direct fluid connection with a third horizontally annular chamber, third fluid inlet means leading into said third chamber, said third fluid inlet means being tangentially arranged relative to said third chamber to direct fluid streams toward impingement against each other within said third chamber to form a turbulent, horizontal vortex therein, a second centrifugal separator chamber leading downwardly from said third chamber, a second fluid exhaust duct leading upwardly from said second centrifugal separator chamber, and a quiescent chamber of larger area than said second centrifugal separator chamber and in fluid connection therewith.

9. The apparatus of claim 8 wherein a third fluid exhaust duct leads from the top of said quiescent chamber, and wherein a filter means is operatively connected to each of said exhaust ducts.

References Cited

UNITED STATES PATENTS

| | | | |
|---|---|---|---|
| 2,032,827 | 3/1936 | Andrews | 34—57 X |
| 2,237,091 | 4/1941 | Stephanoff | 34—57 X |
| 2,856,268 | 10/1958 | Young | 34—57 X |
| 3,135,588 | 6/1964 | Helming | 34—57 |
| 3,140,862 | 7/1964 | Schoppe | 34—57 X |

FREDERICK L. MATTESON, JR., *Primary Examiner.*

JOHN J. CAMBY, *Examiner.*